United States Patent
Hodges et al.

(10) Patent No.: US 10,335,887 B2
(45) Date of Patent: Jul. 2, 2019

(54) METHODS AND SYSTEMS FOR PLASMA CUTTING HOLES AND CONTOURS IN WORKPIECES

(71) Applicant: LINCOLN GLOBAL, INC., City of Industry, CA (US)

(72) Inventors: Charles W. Hodges, Goose Creek, SC (US); Jeremy Stone, Summerville, SC (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 1084 days.

(21) Appl. No.: 14/079,799

(22) Filed: Nov. 14, 2013

(65) Prior Publication Data

US 2015/0129563 A1    May 14, 2015

(51) Int. Cl.
| | | |
|---|---|---|
| B23K 10/00 | (2006.01) | |
| B23K 31/10 | (2006.01) | |
| B23K 103/04 | (2006.01) | |

(52) U.S. Cl.
CPC ............ *B23K 10/00* (2013.01); *B23K 10/006* (2013.01); *B23K 31/10* (2013.01); *B23K 2103/05* (2018.08)

(58) Field of Classification Search
CPC ........... H05H 1/34; B23K 10/00; B23K 10/02
USPC ............. 219/121.36, 121.48, 121.5, 121, 58; 700/117, 159, 302
See application file for complete search history.

(56) References Cited

U.S. PATENT DOCUMENTS

| | | | | |
|---|---|---|---|---|
| 8,168,916 B2 * | 5/2012 | Hussary | ................... | H05H 1/36 219/121.39 |
| 2005/0077271 A1 | 4/2005 | Delzenne et al. | | |
| 2005/0172764 A1 * | 8/2005 | Fagan | ................... | B23K 7/105 83/13 |
| 2010/0155377 A1 * | 6/2010 | Lindsay | ................ | B23K 31/10 219/121.44 |
| 2011/0290767 A1 | 12/2011 | Muscat-Tyler et al. | | |

FOREIGN PATENT DOCUMENTS

| | | |
|---|---|---|
| CN | 101952076 A | 1/2011 |
| JP | 11-320102 A | 11/1999 |

OTHER PUBLICATIONS

Colt, Jim, "Techniques to Improve Small Hole Cut Quality on Carbon Steel With a CNC Plasma System," Hypertherm, Inc., 16 pages, 2001.
International Application No. PCT/IB2014/002428, International Search Report & Written Opinion, 15 pages, dated Apr. 20, 2015.

* cited by examiner

*Primary Examiner* — Tu B Hoang
*Assistant Examiner* — Thomas J Ward
(74) *Attorney, Agent, or Firm* — Perkins Coie LLP

(57) ABSTRACT

Embodiments of the present invention include systems and methods of using a plasma arc torch to cut holes and contours in workpieces having varying thickness and material properties. The systems and methods of the present invention allow for the cutting of holes and contours without the need for using secondary processing by using particular overburn, tail out and/or cutting parameters.

23 Claims, 6 Drawing Sheets

METHODS AND SYSTEMS FOR PLASMA CUTTING HOLES AND CONTOURS IN WORKPIECES

FIELD OF THE INVENTION

Embodiments of the present invention relate generally to plasma arc cutting torch systems. More specifically, the embodiments relate to method and systems for cutting internal holes and contours in a workpiece using a plasma torch tip system.

BACKGROUND OF THE INVENTION

Plasma cutting uses a focused electric arc to heat a gas flow to the plasma state and the energy from the high temperature plasma flow locally melts the workpiece. For most cutting processes, a secondary gas flow (also known as a shield gas flow, or shield flow) is used to protect the torch and assist the cutting process, by aiding in maintaining a stable arc. As the torch is moved, relative to the workpiece, the workpiece is cut with the plasma, leaving behind a desired hole or contour. However, depending on the shape or the contour being cut, there can be disadvantages to using a plasma cutting system. For example, sometimes the plasma does not remain stable such that the surface of the cut portion of the workpiece can have defects, which include angled or uneven surfaces. While improvements have been made in cutting process to limit these defects, there still remains disadvantages to using plasma in certain cutting situations because defects still remain. This is particularly true when cutting small holes or contours.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY OF THE INVENTION

Exemplary embodiments of the present invention include methods and systems to cut holes and contours in workpieces using a plasma arc torch. The systems include a plasma arc torch, power supply, CNC or other computer based controller, movement devices and a table. The methods include using a lead-in cut, a geometry cut and a overburn or tailout cut having specific characteristics. Utilizing embodiments of the invention as described herein result in improved hole and contour cuts, that do not require secondary processing.

Other aspects and advantages of the invention can become apparent from the following drawings and description, all of which illustrate the principles of the invention, by way of example only.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF THE INVENTION

Figure 1:
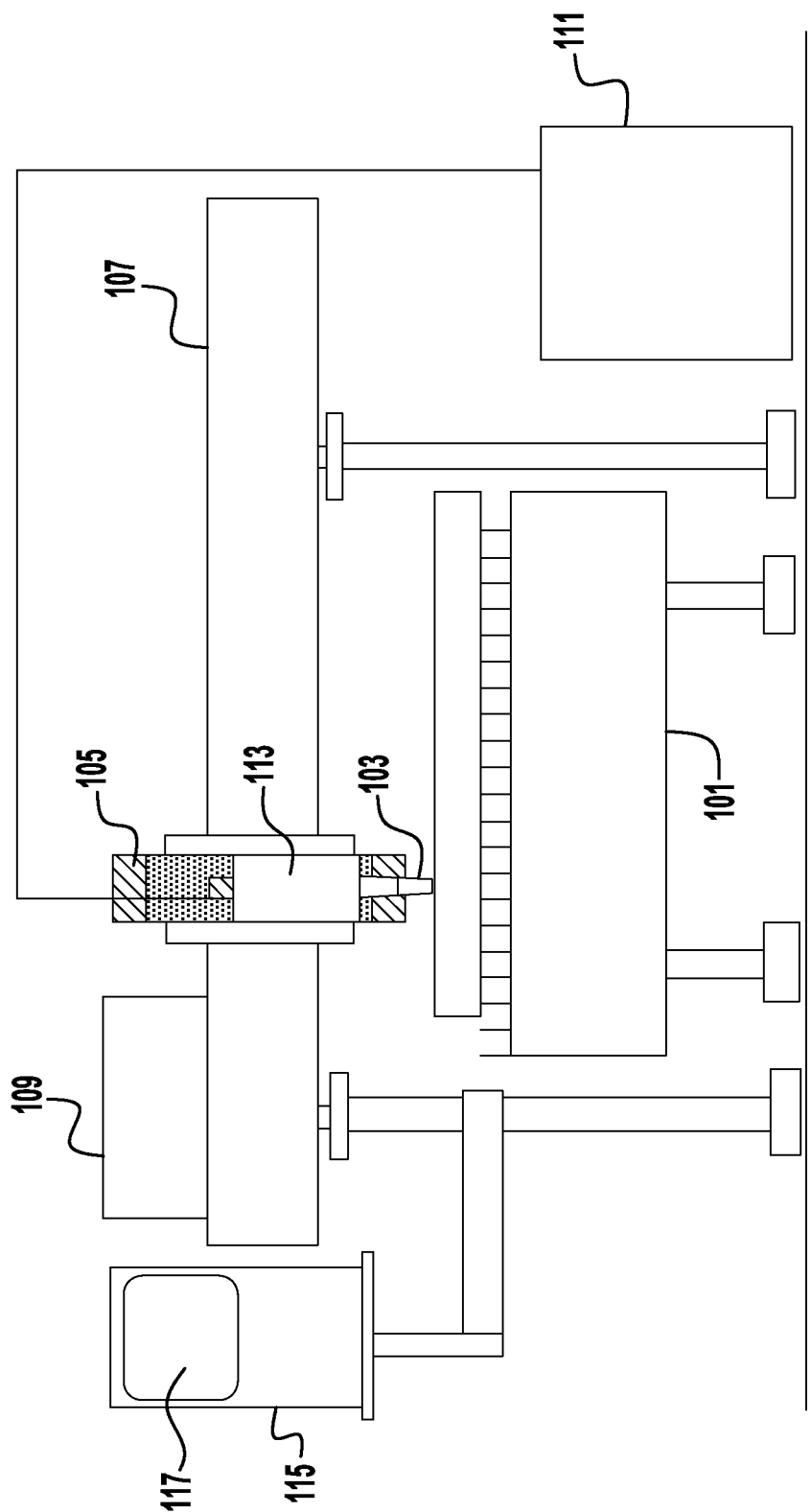
FIG. 1 is a diagrammatical representation of an exemplary embodiment of a plasma cutting system that can be used with embodiments of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Embodiments of the present invention can be used for both holes and contours in workpieces. As understood herein, holes have a shape having a diameter (or equivalent dimension) to workpiece thickness ratio of approximately 6:1 or smaller. That is, exemplary embodiments of the present invention can be used to create high quality holes in workpieces with this ratio without departing from the spirit and scope of the present invention. Further, embodiments of the present invention, can be used in workpieces having a thickness of up to 2 inches. It is noted that the higher ratio holes are typically used in larger thickness workpieces. In many applications of the present invention the workpiece will be at or below 1 inch in thickness. In such applications holes typically have a diameter (or equivalent dimension) to thickness ratio below 3:1. That is, a circular hole in a workpiece of 1 inch thick would have a diameter of approximately 3 inches or less. Holes, as used herein, can be categorized as small internal part features that are not necessarily round, but are at least curved, or have curved portions, such as ovals, ellipses, and other similar shapes, where the equivalent diameter of the hole (if the total perimeter were converted to a circle) has a diameter to thickness ratio of less than approximately 6:1. A contour is typically a larger cut feature in a workpiece and can include both straight or curved cuts. It is noted that although some shapes would have dimensions that are at or below the 6:1 ratio above, they may still be considered contours because of their shape—e.g., squares, rectangles, etc.

As briefly discussed above, defects can be encountered when cutting holes and contours and workpieces using plasma torches. Such defects include taking excess material from the hole/contour sides, leaving behind protrusions on the wall of the hole or contour, beveling or tapering the hole/contour walls. These defects can be problematic in many workpieces and can cause the need for a secondary process such as drilling, or the scrapping of a workpiece. In either case, there can be significant cost and delay incurred due to the presence of these defects. Embodiments of the present invention eliminate these defects and provide for highly efficient and accurate cutting or holes and contours. Further, embodiments of the present invention can be employed with many different cutting systems using various plasma cutting components, without departing from the spirit or scope of the present invention.

FIG. 1 depicts an exemplary plasma cutting system 100. The plasma torch system 100 includes a cutting table 101 and plasma torch 103. The construction and operation of cutting tables and plasma torches are well known by those of skill in the art and will not be discussed in detail herein. The system 100 can also use a torch height controller 105 which can be mounted to a gantry system 107. The system 100 can also include a drive system 109 which is used to provide motion to the torch 103 relative to a workpiece positioned in the table 101. A plasma cutting power supply 111 is coupled to the torch 103 to provide the desired current used to create the cutting plasma. The system 100 can also include a gas console 113 that can be used to regulate gas flow rates and pressures used for both the plasma and shield gas during the cutting operation. The console 113 can also be used to select different gases depending in the cutting operation that is being performed. That is, certain gases may be used for some cutting operations, but would not be used for others. The torch system 100 also includes a computer numeric controller (CNC) 115, which can include a user input/display screen 117. The screen 117 and CNC 115 are used by the user to input and read cutting operational parameters and data, and allow the system 100 to be used as an automated, programmable cutting system. Various input parameters can be input by a user into the CNC, via the screen 117 (or other means) including: torch current, material type, material thickness, cutting speed, torch height, plasma and shield gas composition, etc. As stated above, the plasma system 100 can have many different configurations, and embodiments are not limited to that shown in FIG. 1, which is intended to be exemplary.

As is generally understood by those of ordinary skill in the art, the CNC 115 can be any type of computer system that controls the system 100. As is general known, a CNC has a processor, electronic storage device, and an interface for providing control instructions to a plasma arc torch system 100. The storage or memory device can be internal or external and can contain data relating to the part to be cut in the workpiece. In other embodiments, the CNC 115 can be manually programmed, and in some embodiments the CNC 115 can include a computer readable product that includes computer readable instructions that can select or configure operating parameters of the plasma torch system. In further exemplary embodiments the computer readable instructions can be cut charts or nesting software. Such instructions typically include cutting information including instructions for the system 100 when cutting various holes or contours, taking into account the sizes and shapes of the holes/contours and the material being cut. As is generally understood the CNC 115 can allow a user to cut numerous successive holes, contours or a combination of holes and contours in a workpiece without stopping between cuts. For example, the operator can select a cutting program that includes both hole and contour cutting instructions, and the CNC 115 will determine the order and positioning of the cuts, as well as the various parameters of the cuts based on the user input information.

The user interface/screen 117 coupled to a computer 115 illustrates one possible hardware configuration to support the systems and methods described herein, that is being the controller for the system 100. Of course, similar controller type systems can be used to control and/or operate the systems described herein. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The controller of the system (for example 115) can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The controller (for example 115) can further include a hard disk drive, a magnetic disk drive, e.g., to read from or write to a removable disk, and an optical disk drive, e.g., for reading a CD-ROM disk or to read from or write to other optical media. The controller can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by a user interface coupled to the controller.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface 300 can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with a user interface coupled to the controller 195 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from a user interface via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 2:
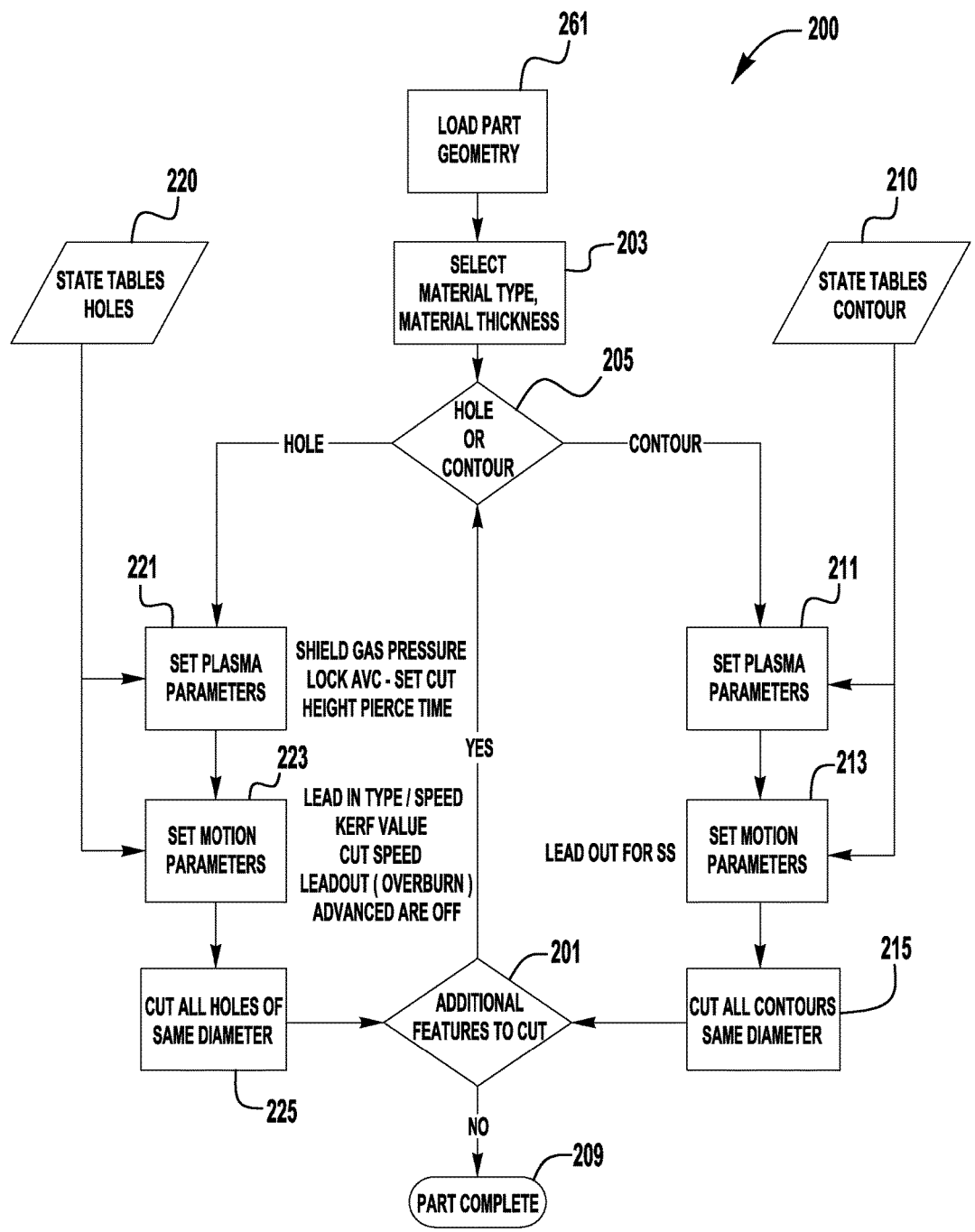
FIG. 2 is a diagrammatical representation of an operational flow chart for an embodiment of the present invention.

FIG. 2 depicts a flow chart 200 that can be used by exemplary embodiments of the present invention in conjunction with the CNC 115, to generally describe an operation of the system 100. At an initial stage of the process a part geometry is loaded 201 into the CNC 115. The part geometry can include the geometry of the overall workpiece and the geometry of the finished hole, contour or part to be cut. This can be done manually by a user or can come automatically from other systems, in a more automated process. This can also be done via a look-up table of various preprogrammed hole or contour shapes (for example, circle), for which the user can then input various parameters for the shape. For example, the user can select from a number of different shapes like circles or squares, and the user can input a parameter for the circle, such as its diameter, or the length of one side of the square. After the part geometry is loaded, a material type and thickness of the workpiece to be cut. This data is used by the CNC 115 to determine the proper operational parameters for the cutting operation. This will be discussed in more detail below. Following the entry of material information 203 a determination is made as to whether or not the cut is a hole or a contour 205. This determination can be made manually—by the user, or can be made automatically, by the CNC 115 based upon the entered date for the cut. Based on the determination as to whether the cut is for a hole or a contour 205, the CNC 115 will use different data and parameters to control the cutting operation. If the cutting operation is a contour, the CNC 115 will use state tables for contours 210, which includes data and parameter details for cutting contours. Using that data the CNC sets the plasma parameters 211, the motion parameters 213 for the cutting operation and then the system 100 cuts all of the contours having the same dimensions 215. Of course, the contours can also be cut one-at-a-time in other embodiments. If there are no additional features to cut 207 the cutting process is ended 209. Similarly, if the shapes to be cut are holes a different look-up table 220 is used. The data/parameters from that table 220 are used to set the plasma parameters 221, the motion parameters 223 and then the holes are cut 225. Again, the CNC 115 can cut all of the holes having the same diameter, or can cut the holes one-at-a-time.

Figure 3A:
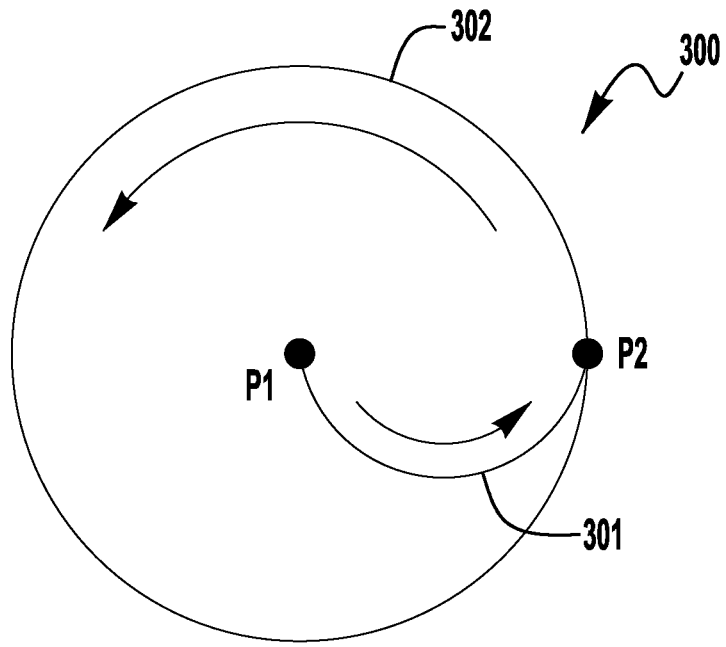
FIGS. 3A to 3D are diagrammatical representations of a cutting operation for a hole in accordance with embodiments of the present invention.
Figure 3B:
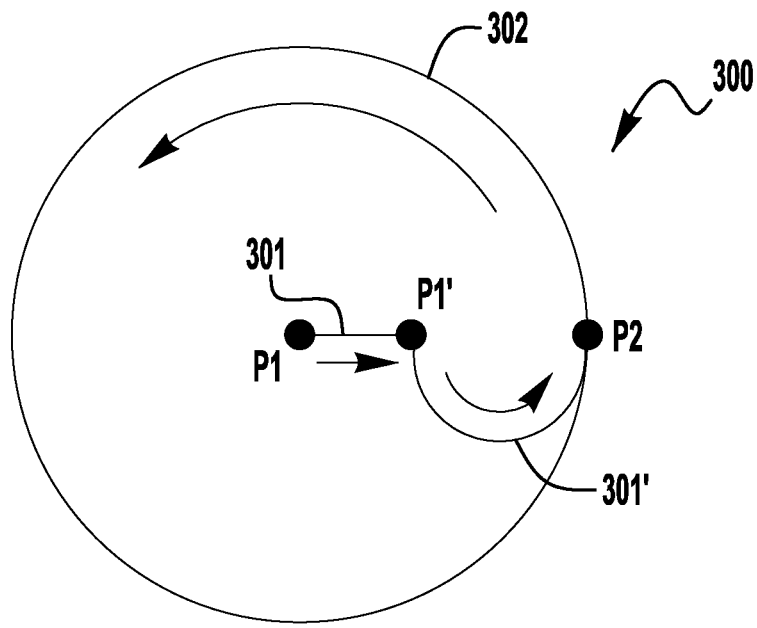
Figure 3C:
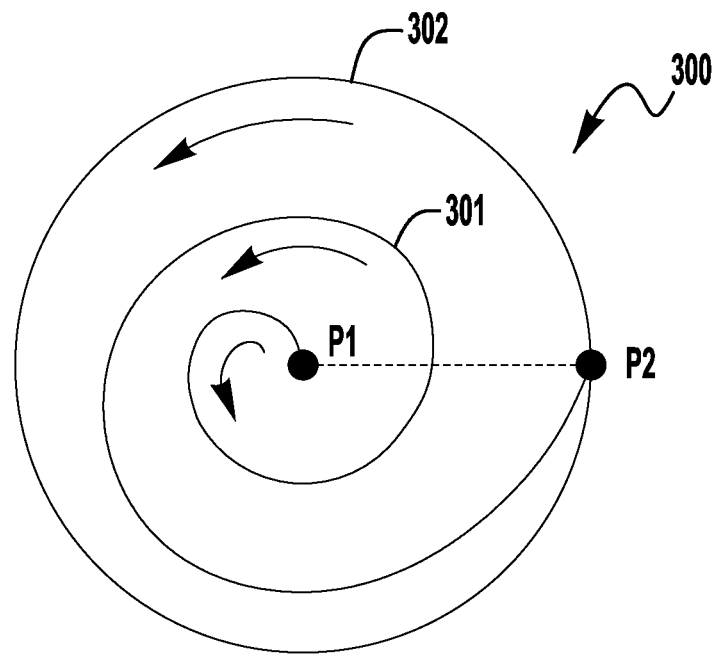

Turning now to FIGS. 3A through 3C, each of the figures depict a lead-in path for cutting a hole feature in accordance with an exemplary embodiment of the present invention. Because of the advantages of employing the methods and systems described herein, hole features can be cut with minimal defects, and without the need for secondary processing of the holes, such as drilling, deburring, etc. In fact, exemplary embodiments of the present invention can be used to provide high quality holes in mild steel workpieces where the hole diameter to material thickness ratio is ¾:1 or less with workpiece thicknesses up to 1 inch thick, and in stainless steel workpieces where the hole diameter to material thickness ratio is 1:1 or less with workpiece thicknesses up to 1 inch thick. In prior cutting processes, such ratios required costly and inefficient secondary processing. In exemplary embodiments, bolt quality holes can be cut in mild steel up to 2 inch thick having a hole diameter to material thickness in the range of ½:1 to ¾: 1, and bolt quality holes can be cut in stainless steel up to 1 inch thick having a hole diameter to material thickness in the range of ¾:1 to 1:1. Of course, larger diameter holes can also be cut, but this smaller ranges demonstrate the high precision benefits of embodiments of the present invention. As generally understood, bolt quality holes are holes cut for bolts, or other fasteners, that are within the tolerance levels to be allowed for use with the fastener without the need for secondary operations, such as drilling. Prior to embodiments of the present invention, such bolt quality holes could not have been achieved without a secondary operation.

FIG. 3A depicts a first embodiment of a lead-in cut to be used when cutting holes in accordance with embodiments of the present invention. The hole 300 has a diameter D, which is the desired diameter for the hole 300. During cutting of the hole, the first operation is to pierce the workpiece at point P1. Typically, the pierce point P1 is at the geometric center of the hole 300 to be cut. Prior to piercing the workpiece, the CNC 115 determines the pierce time, pierce point (e.g., center of hole) and the kerf value for the plasma. Each of these parameters are determined based on the information input into the CNC 115, which can include: material type, material thickness, hole diameter, plasma current, etc. In most embodiments, the pierce point P1 will be at the geometric center of the hole 300, and the pierce time will be function of the type and thickness of the material. In exemplary embodiments of the present invention, as the thickness of the material increases and the diameter D of the hole decreases, the pierce time will increase. By extending the pierce time for smaller diameter holes in thicker material there is a better transition from the lead-in cut to the hole geometry cut—which will be discussed further below. Further, the kerf value—thickness of the kerf of the cut—is used to calculate the lead-in trajectory as it approaches/reaches P2 to achieve a smooth transition into the hole geometry.

As shown in FIG. 3A, the lead-in path 301 is an arc path, such that there is no an abrupt transition from the lead-in path 301 to the cut-path 302 for the hole 300. In the embodiment shown, the lead-in path 301 has an arc shape from the pierce point P1 to the cut point P2, which is the beginning of the hole geometry. In exemplary embodiments, the lead in path 301 is semi-circular in shape—having a constant radius. However, in other exemplary embodiments, the lead-in path 301 can have an elliptical or oval shape such that the radius of the lead-in path 301 is not constant from point P1 to point P2. Further, the feed rate or speed of the arc in lead in path 301 is set and determined by the CNC 115 to allow for some additional material to be left at the lead-in transition to the hole geometry (point P2) so that no gouging will occur during lead out (discussed more fully below). Specifically, the lead-in feed rate is determined by the CNC 115 based on material type, thickness, hole diameter, and cutting current and is typically chosen to leave some extra material at the transition from lead in to hole geometry P2. This is contrary to many known systems that remove all material at point P2. That is, a small protrusion, or excess material, can be left at point P2, which will be removed at the end of the cutting process. In some exemplary embodiments, the lead in feed rate is the same speed as the hole geometry feed rate (the speed at which the hole is cut). By keeping the feed rate speeds the same between the lead-in and hole geometry, defects that can be caused by speed transitions are minimized. However, in other embodiments, the feed rate of the lead-in path 301 is different than the feed rate for the hole geometry 302. That is, in some embodiments the feed rate of the lead-in path is slower than the feed rate for the hole geometry, while in other embodiments it can be faster. For example, in many high amperage applications (150 amps or higher) it is beneficial to have the lead-in rate being higher than the hole geometry feed rate. Of course, this may also be dictated by the material being used and its thickness. Exemplary embodiments of the present invention can utilize and optimize the difference—if any—between the lead in rate and the geometry cutting rate to eliminate gouging in the work piece. That is, in some embodiments it is beneficial to have the lead in rate faster than the geometry cutting rate to ensure that the torch does not gouge the geometry wall—which can occur if the torch is traveling too slow. Further, in exemplary embodiments of the present invention, the cut height for the torch 103 is set at the same height in the lead in cut 301 that is to be used for the hole geometry path 302.

FIG. 3B depicts another exemplary embodiment of a lead in path 301'/301" that can be used. In this embodiment a line-arc lead in path is utilized in which the lead in comprises a line path 301' and an arc path 301", where the arc path 301" transitions to the hole geometry 302 at point P2. In some embodiments—for example when the hole diameter is larger, relative to the workpiece thickness—a line—arc path can be used, where the first portion of the lead-in is a straight line 301' and the second portion is an arc path 301" from the line to the geometry point P2. Such an embodiment can provide less gouge time by the arc near the perimeter of the hole geometry during lead in to ensure proper hole formation. This is because the radius of the arc segment 301" is smaller than if a full arc is used from pierce P1 to lead in P2, making the arc tighter, thus making the entry to the transition point P2 steeper. For example, such an embodiment could be advantageous when using higher amperages with high thickness materials, and with holes having a larger diameter. In such embodiments, the length of the line segment 301' is in the range of 35 to 65% of the length of a radius of the hole 300. Again, the arc portion 301" of the lead in path can have a constant, or varying, radius between the line portion 301' and the hole geometry point P2.

FIG. 3C depicts another exemplary embodiment of a lead in path 301 that can be utilized. In particular, FIG. 3C depicts a lead in path 301 that can be used with stainless steel materials. Specifically, FIG. 3C depicts a spiral lead in path 301, which has a longer length than arc or arc-line lead in paths. It has been discovered that when cutting holes in stainless steel workpieces, particularly those which have a thickness of at least ¼ inch, there is a high incident level of out-of-roundness for the hole, and uncut material tags or protrusions left behind. This often requires secondary processing such as drilling or grinding. In embodiments of the present invention, the lead-in path is extended to make a spiral path 301 which provides further heat input into the workpiece which results in a better hole geometry upon completion. That is, the spiral lead in 301 effectively skims and preheats the hole geometry 302 prior to the hole geometry being cut in the cutting pass. This preheating allows for the hole geometry cutting pass to proceed more smoothly and more predictably, which creates a more round hole and reduces the incidence of excess material being left behind. The amount of spiral lead in depends on the hole diameter D, material thickness and current. In exemplary embodiments of the present invention, the spiral lead in 301 passes through an arc path in the range of 240 to 720 degrees. (The embodiment shown in FIG. 3C shows a lead in 301 passing through 630 degrees). In some exemplary embodiments, the spiral lead in 301 passes through an arc of at least 360 degrees. By extending the lead in this way, the workpiece can be preheated near the hole geometry and a round hole can be cut without the need for secondary processing. This is particularly true with stainless steel work pieces having a thickness of at least ¼ inch, and when cutting holes having a diameter to thickness ratio of 2:1 or greater.

Figure 3D:
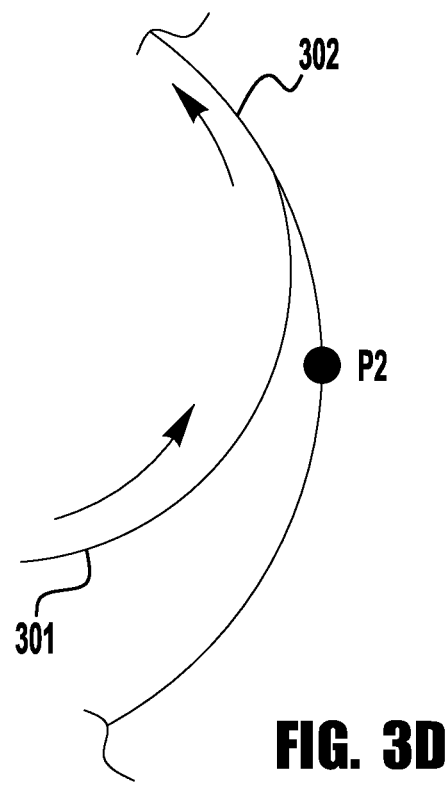

It is noted that in each of the above lead-in discussions, the lead-in path 301 transitions to the hole geometry 302 at point P2 such that the lead in path is approximately tangential to the hole geometry path 302 at point P2. By being nearly tangential, the transition is smooth from lead-in 301 to hole geometry 302 is smooth. Further, as stated above, in some exemplary embodiments the lead in path speed and geometry is selected such that a small portion of excess material is present at point P2, as shown in FIG. 3D. As shown in this figure, the lead in path 301 does not intersect with the perimeter 302 exactly at the lead in point P2, but does so close to the lead in point. This leaves some excess material radially inward from and downstream of (in the travel direction) the lead in point P2, as shown. The presence of this excess material allows for the prevention of gouging during lead out/overburn of the cutting operation (discussed more below). That is, the presence of this excess material in some applications aids in preventing the arc from gouging the workpiece as it completes the perimeter geometry and enters the lead out or overburn stage of the cut.

After the lead in cutting operation (301) the cutting process proceeds to the hole geometry cut 302 (see FIGS. 3A to 3C). During the hole geometry cut 302 the CNC 115 controls the cut height, the cut speed, current, shield gas pressure and kerf value to achieve the desired cut dimensions. Based on the input data, the CNC 115 sets the proper cut height for the torch 103, which is typically kept constant during the cutting process. Further, the CNC 115 determines and sets a cut speed for the hole geometry which is based on the user input data. For example, the CNC 115 takes into account the hole diameter D, the material type, material thickness and the cutting current used for the plasma. It is noted that if the cutting speed is too high the hole can have an undesirable taper, whereas if the cut speed is too slow the cut face on the workpiece and the bottom edge of the hole can be distorted. Additionally, the CNC 115 adjusts and controls the shield gas pressure during the hole geometry cut 302 to ensure a smooth and accurate cut. The adjustment/change of the shield gas pressure from the lead in cut 301 to the hole geometry cut 302 is used to aid in controlling the taper/bevel of the cut. Having the shield gas pressure decrease typically gives a positive bevel to the edge of the cut. Thus, embodiments of the present invention use a decreased shield gas pressure during cutting of the hole geometry 302 to compensate for the normal beveling that can occur when cutting holes, thus providing improved cutting of the hole. In some exemplary embodiments, the shield gas pressure used during the cutting of the hole geometry cut 302 is the same as that used for the lead in cut 301, while in other exemplary embodiments, the shield gas pressure is dropped such that it is less than the shield gas pressure used during lead in 301. In addition to the above, the kerf value for the cutting operation is also controlled and set by the CNC 115 to ensure that a correct hole size is obtained.

Figure 4:
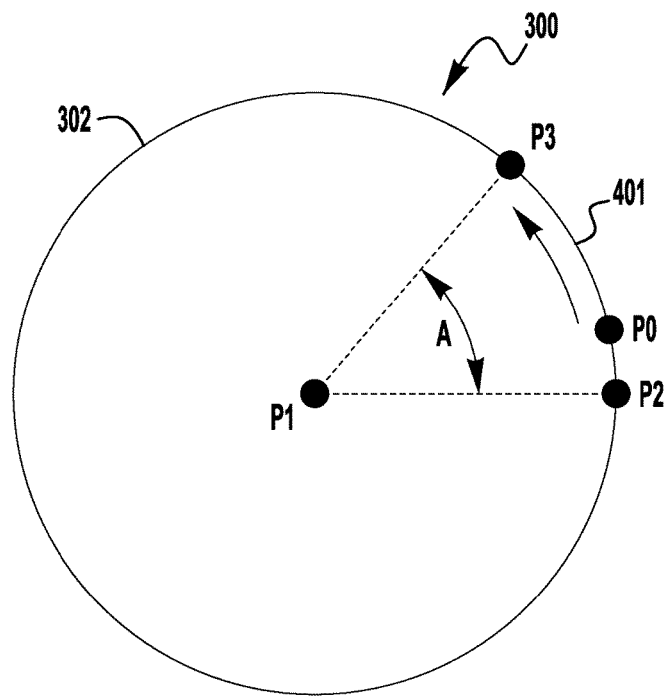
FIG. 4 is a diagrammatical representation of a lead-out path for a hole cutting operation in accordance with an embodiment of the present application.

FIG. 4 depicts an exemplary embodiment of a lead-out cut that can be utilized with embodiments of the present invention. Many known systems extinguish the cutting arc at or prior to the torch 103 reaching the point P2. However, this process can leave protrusions in the hole which require secondary processing. Embodiments of the present invention eliminate the need for secondary processing by utilizing a lead-out portion 401 as described herein. The lead out portion 401 follows the same path as the corresponding hole geometry portion, such that the paths of each portion overlap, as shown in FIG. 4.

Specifically, embodiments of the present invention utilize an overburn distance to determine an arc-off timing value used to instruct the power supply 111 to turn off the plasma current at a time prior to the completion of the lead out point P3, and to determine the point P3 at which the lead out portion is completed. This determination allows the arc to remain on as the torch passes by the point P2 and leads out to point P3. That is, embodiments of the present invention use arc overburn to ensure a smooth transition at the completion of the hole cutting operation. This is further explained below, in conjunction with FIG. 4.

For each cutting operation, the CNC 115 contains overburn distances for different cutting operations, where the overburn distance is a distance from the hole geometry lead in point—P2—to a overburn point P0, where during the overburn distance the plasma arc is maintained at or near its cutting strength used during the hole geometry cut. In some exemplary embodiments, the cutting current is maintained by the power supply 111 at or near the cutting current level for the hole geometry cut. In some exemplary embodiments, the current stays at the same level. However, in other exemplary embodiments, the cutting current is maintained by the power supply 111 within the range of 20% of the cutting current during the overburn distance. For example, if the primary cutting current is 100 amps, the power supply 111 can reduce the current to 80 amps during the overburn distance. The overburn distance is used by the CNC 115 to determine an arc-off timing signal for the power supply 111 such that the power supply 111 can be instructed to turn off the cutting current so that the arc is fully extinguished prior to or at the time when the torch reaches the point P3. The overburn distance and arc-off timing signal are utilized by the CNC 115 to ensure that an arc is still present as the torch 103 passes by the lead in point P2 to complete the hole geometry. It is noted, however, that is some exemplary embodiments the CNC 115 may use the overburn distance and the arc-off timing signal to control the cutting current such that the cutting current is diminished, or turned off, by the power supply 111 prior to the torch 103 reaching the lead in point P2, but because of inherent arc shutdown lag times the arc can still be present as the torch passes by the lead in point P2 as it travels to the lead out point P3. This will be explained in more detail below.

In exemplary embodiments of the present invention, the overburn distance for each cutting operation is set based on various parameters including any combination of hole diameter D, feed rate, material thickness, material type, and arc amperage. In exemplary embodiments of the present invention, the CNC 115 stores various preset overburn distances for different cutting operations and parameters, such that when a user inputs various process information an overburn distance is determined. Such data can include hole diameter D, material thickness, material type and cutting plasma current. For example, after a user inputs the input parameters for a cutting operation, the CNC 115 determines the overburn distance to be utilized for the hole cutting operation. This determination can be made by utilizing look-up tables, algorithms, or other similar methodologies stored in the CNC 115. For example, in some exemplary embodiments, the larger the diameter D of the hole to be cut, the longer the overburn distance that will be utilized. In exemplary embodiments of the present invention the overburn distance is in the range of 0.01 to 0.3 inches. In other exemplary embodiments, the overburn distance can be in the range of 0.02 to 0.1 inches. Typically, the thicker the workpiece and the larger the hole, the longer the overburn distance.

Once the overburn distance is determined, the CNC 115 then determines the overburn time. The overburn time is determined by dividing the overburn distance by the hole geometry feed rate (ipm)/60. That is:

Overburn Time=(Overburn Distance/(Hole Geometry Feed Rate/60))

The CNC 115 then uses the overburn time to determine an arc-off timing value. The arc-off timing value is used to determine the end point of the P3 of the lead out portion 401 at which time the cutting process is complete and the movement of the torch 103 can be ended. In exemplary embodiments of the present invention, the CNC 115 utilizes the determined overburn time, along with other parameters to determine the end point P3. For example, embodiments of the present invention can also take into account an arc lag time and/or an arc shutdown time. The arc lag time is a predetermined lag time that represents the arc lag of the power supply. That is, the arc lag time is a length of time it takes the plasma arc to substantially react to a change in output current from the power supply—for example, due to system inductance. The arc shutdown time is a predetermined length of time that it takes for an arc to be extinguished once the current is turned off by the power supply. The arc shutdown time is a predetermined value that is a function of the power supply and the cutting current level. In exemplary embodiments of the present invention the arc lag time is in the range of 0.05 to 0.2 seconds, and the arc shutdown time is in the range of 0.125 to 0.6 seconds.

Thus, in some exemplary embodiments arc-off timing value is determined by summing the determined overburn time, arc lag time and arc shutdown time. This summed arc-off timing value (in seconds) is used, in conjunction with the feed rate of the operation, to determine the end point P3 of the lead out portion 401. With this determined arc-off timing value the CNC 115 controls the operation of the system 100, including the movement of the torch 103, such that the torch 103 is stopped at the point P3. In exemplary embodiments of the present invention, the end point P3 is in the range of 20 to 35 degrees radially beyond the point P2.

By using the systems and methods described above, embodiments of the present invention can create high precision holes in workpieces, that do not require secondary processing to complete the holes.

In addition to providing for high quality holes, embodiments of the present invention are capable of providing high precision contours, that do not require secondary processing. In addition to creating defects in cutting holes, known systems also can create defects when cutting contours. Such defects can include protrusions or excess material which require grinding to complete the part or contour. Embodiments of the present invention can create contours without the need of such secondary processing.

Figure 5:
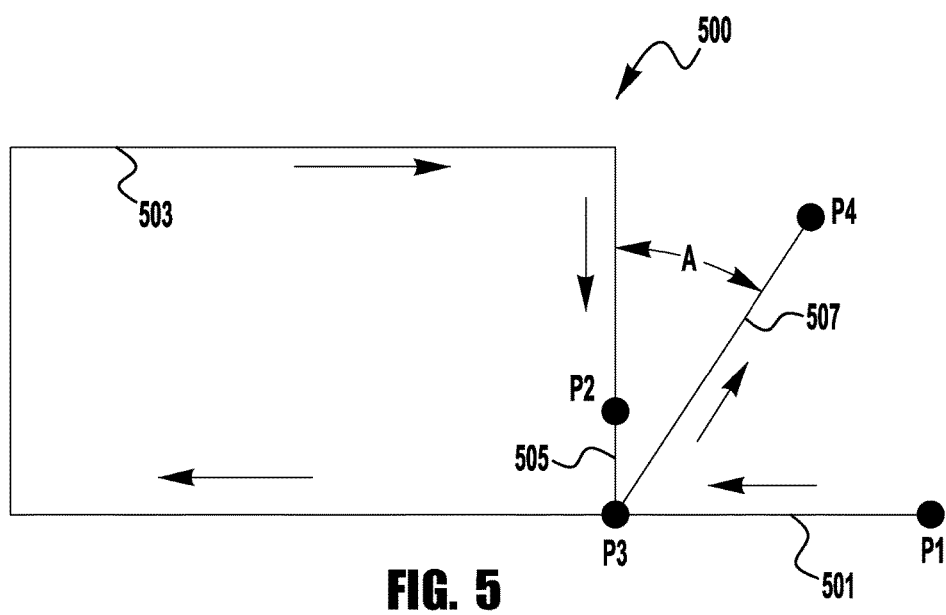
FIG. 5 is a diagrammatical representation of a cutting operation for a contour in accordance with an exemplary embodiment of the present invention.

FIG. 5 depicts an exemplary contour that can be cut with embodiments of the present invention. It is noted that while the contour shown in FIG. 5 is a rectangle, embodiments of the present invention are not limited to this, as other shapes can be cut without departing from the spirit or scope of the present invention. Further, exemplary systems like the system 100 shown in FIG. 1 can be used to cut contours as described herein.

As shown, the contour 500 has a lead in portion 501 extending from the pierce point P1 to the beginning of the part geometry path P3. As shown in FIG. 5, the lead in portion 501 can be a straight line. However, in other embodiments it may be desirable to use a curved or arced lead in depending on the shape of the contour. Embodiments are not limited in this regard. Once the lead in 501 is cut, the system 100 cuts the part geometry path 503, following the desired geometry for the part 500. In exemplary embodiments, the lead in portion 501 and the geometry path portion 503 are cut using the same cutting parameters, such as speed, cut height, current level, voltage, current, etc. As generally understood, the parameters for the cutting operation are dictated and determined by user input information, such as: material thickness, material type, current, etc. When the geometry path portion reaches a transition point P2, which is at a point short of completion of the desired contour, the cutting operation reaches a slowdown portion 505, during which the CNC 115 slows the feed rate for the torch 103 and locks out the torch height control or arc voltage height control (each of which are generally known) of the system 100 used to maintain the height of the torch 103 during the operation. The structure and operation of height control systems, which are oftened called torch height control or arc voltage height control circuits or systems, are known in the automated plasma cutting industry and need not be described in detail herein. The locking out, or disabling, of the height control system (which can be either in the CNC or the power supply, or both) is particular advantageous in materials such as stainless steel because of the arc lag when cutting stainless steel. The slowing of the feed rate aids in keeping the arc nearly vertical through the completion of the cut, but if the voltage height control remains on it will cause the torch 103 to move closer to the workpiece and eventually contact the workpiece. Therefore, the torch is slowed down and its height control mechanism or control function is disabled so that the torch 103 is not controlled by the CNC 115 to adjust for the slowdown—which can result in the torch 103 crashing into the workpiece. In exemplary embodiments of the present invention, the feed rate during the slowdown portion 505 is in the range of 25 to 45% of the feed rate for the geometry path portion 503. In some exemplary embodiments, the feed rate is in the range of 30 to 36% of the feed rate for the geometry path portion 503 of the contour 500. This is particularly advantageous with stainless steel workpieces.

Further, as shown in FIG. 5, the transition point P2 is located along the perimeter of the contour near the end point P3 of the contour 500. That is, the transition point P2 is located near the end of the cutting process for the contour 500. In exemplary embodiments, the transition point P2 is positioned in the range of 80 to 99% of the total perimeter length of the contour 500. In other exemplary embodiments, the transition point P2 is positioned in the range of 90 to 98% of the total perimeter length of the contour 500. Typically, in many exemplary embodiments, the distance between P2 and P3 is in the range of 0.125 to 0.5. In other exemplary embodiments the distance is in the range of 0.25 to 0.4 inches. Factors that can affect the optimum distance between P2 and P3 are arc amperage and material thickness. By having a sufficient distance for the slowdown portion 505 of the contour path a cleaner cut is made at the transition point P3 at the end of the cutting of the contour 500.

Figure 6A:
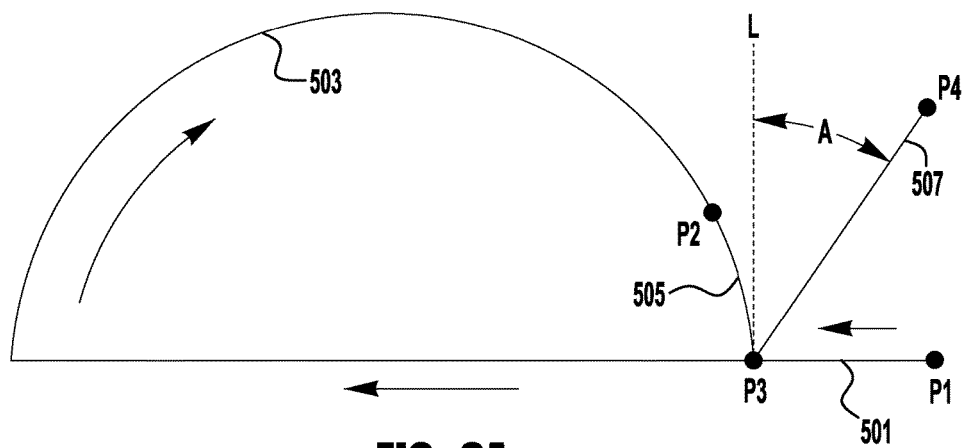
FIGS. 6A and 6B are diagrammatical representations of other contours made in accordance with exemplary embodiments of the present invention.
Figure 6B:
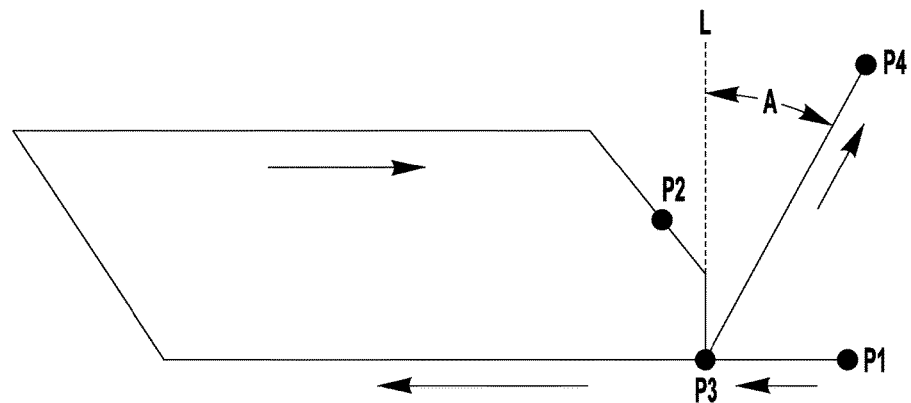

Also, as shown in FIG. 5, after the torch 103 reaches the point P3 to complete the contour the torch 103 is retracted from the contour in a tail out portion 507 at an angle A relative to the slowdown portion 505 of the contour 500. The angle A allows the torch 103 to make a hard corner at point P3 which causes the cutting plasma to cut off any tabs or excess material left at the point P3, using older systems. This is particularly effective when the contour 500 is being cut in stainless steel workpieces. In exemplary embodiments, the tail out portion 507 is performed at the same feed rate and control settings as the slowdown portion 505. This is particularly true in the initial stages of the tail out portion 507. In some exemplary embodiments, after the torch is moved from the vicinity of the transition point P3, the speed or other parameters of the cutting operation can be changed before the end point of the cut P4. Further, in exemplary embodiments of the present invention, the angle A is in the range of 20 to 40 degrees. In other exemplary embodiments, the angle A is in the range of 28 to 32 degrees, and in some exemplary embodiments the angle is 30 degrees. It is noted that angle A, which dictates the direction of the tail out portion 507, is measured from a line that lies along the path of the end of the slowdown portion 505 when the slowdown portion 505 intersects with the intercept point P3. In FIG. 5 this line lies along the same line as the slowdown portion 505 for the length of the slowdown portion 505 (because it is a straight line). FIGS. 6A and 6B depict other exemplary embodiments, when the contour is not a rectangular shape as shown in FIG. 5. In FIG. 6A, a portion of the contour 500 is a semi-circle such that the line L, from which the angle A is measured, lies along the tangent of the semi-circular portion at the intersect point P3. FIG. 6B shows the slowdown portion 505 having at least two line segments. As such the orientation of the line L coincides with the line segment that intersects the transition point P3. This ensures that the tail out 507 is made at an angle that is sharp enough to make a sharp and clean corner at the transition point P3.

As explained previously, the above-described techniques can be implemented in the CNC 115, or any other computer controlled system, using digital electronic circuitry, or in computer hardware, firmware, software, or in combinations of them. The implementation can be as a computer program product, i.e., a computer program tangibly embodied in an information carrier (e.g., a CPS). An information carrier can be a machine-readable storage device or in a propagated signal, for execution by, or to control the operation of, data processing apparatus (e.g., a programmable processor, a computer, or multiple computers).

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific illustrative embodiments, it should be understood that various changes in form and detail may be made without departing from the spirit and scope of the invention.

We claim:

1. A plasma arc torch system configured to cut contours and holes of different shapes and sizes in workpieces of different thicknesses and material types, the plasma arc torch system comprising:

a plasma arc torch which receives a plasma arc current and generates a plasma arc to cut a workpiece; and a computer numerical controller configured to:

select a piercing location in the workpiece with said plasma arc torch;

select, from a plurality of lead in cutting geometries, a first lead in geometry used to lead in to hole geometries and a second lead in geometry used to lead in to contour geometries, select, from a plurality of geometry cutting speeds, a geometry cutting speed based on at least a thickness of said workpiece; and select, from a plurality of lead out cutting geometries, a first lead out geometry when leading out from hole geometries and a second lead out geometry when leading out from contour geometries, wherein for said first lead out geometry, after said plasma arc torch reaches a lead in point from said first lead in geometry, said computer numerical controller maintains said plasma arc on said plasma arc torch for an overburn distance past said lead in point and moves said plasma arc along a perimeter of said hole geometry past said lead in point, and wherein after said overburn distance said plasma arc current is turned off to said plasma arc torch and said plasma arc torch is moved along said perimeter until said plasma arc is fully extinguished, and wherein for said second lead out geometry, after said plasma torch reaches a lead in point for said contour geometry, said computer numerical controller maintains said plasma arc on said plasma arc torch for a tail out portion which extends from said lead in point, where said tail out portion is cut at an angle relative to a line coincident with the perimeter of the contour at said lead in point at the conclusion of the creation of the perimeter and said angle is in the range of 20 to 40 degrees.

2. A computer readable product, tangibly embodied on an information carrier, and operable on a computer numeric controller for cutting at least one hole in a workpiece with a plasma arc torch system, the computer readable product including instructions being operable to cause the computer numeric controller to:

pierce the workpiece at a center of said at least one hole with a plasma arc created by said plasma arc torch;

cut a lead in for said at least one hole with said plasma arc created by said plasma arc torch which extends from said center to a perimeter of said hole, where said lead in reaches said perimeter at or near a lead in point, and at least a portion of said lead in is arcuate in shape;

cut said perimeter of said hole with said plasma arc at a first arc current value, where said perimeter is cut from the point at which said lead in reaches said perimeter to said lead in point, and after said plasma arc torch reaches said lead in point, maintain said plasma arc on said plasma arc torch for an overburn distance past said lead in point and moving said plasma arc along said perimeter past said lead in point at a second arc current, wherein said second arc current is at or near the first plasma arc current, and wherein after said overburn distance said second arc current is turned off and said plasma arc torch is moved along said perimeter until said plasma arc is fully extinguished.

3. A computer readable product, tangibly embodied on an information carrier, and operable on a computer numeric controller for cutting at least one hole in a workpiece with a plasma arc torch system, the computer readable product including instructions being operable to cause the computer numeric controller to:

pierce the workpiece at a center of said at least one hole with a plasma arc created by said plasma arc torch;

cut a lead in for said at least one hole with said plasma arc created by said plasma arc torch which extends from said center to a perimeter of said hole, where said lead in reaches said perimeter at or near a lead in point, and at least a portion of said lead in is spiral in shape; and cut said perimeter of said hole with said plasma arc at a first arc current value, where said perimeter is cut from the point at which said lead in reaches said perimeter to said lead in point, and wherein said lead in passes through at least 270 degrees from said center to said perimeter.

4. A computer readable product, tangibly embodied on an information carrier, and operable on a computer numeric controller for cutting at least one contour in a workpiece with a plasma arc torch system, the computer readable product including instructions being operable to cause the computer numeric controller to:

pierce the workpiece at a point remote from a perimeter of said contour;

cut a lead in for said at least one contour with a plasma arc created by said plasma arc torch which extends from said pierce point to a lead in point on said perimeter of said contour;

cut a first portion of said perimeter with said plasma arc at a first arc current value and at a first feed rate until said plasma arc reaches a transition point along said perimeter which is located short of said lead in point;

cut a second portion of said perimeter with said plasma arc at a second feed rate, which is less than said first rate, from said transition point to said lead in point; and cut a tail out with said plasma arc which extends from said lead in point to an end point remote from said perimeter, wherein said during the cutting of said second portion said plasma arc torch is maintained at a constant height above said workpiece, and wherein said tail out is cut at an angle relative to a line coincident with the second portion as said second portion reaches said lead in point, where said angle is in the range of 20 to 40 degrees.

5. The plasma arc torch system of claim 1, wherein said hole geometries include a hole diameter to workpiece thickness ratio below 3:1.

6. The plasma arc torch system of claim 1, wherein said hole geometries include an equivalent hole diameter to workpiece thickness ratio below 6:1.

7. The plasma arc torch system of claim 1, wherein said computer numerical controller is further configured to cut at least one of numerous successive holes and contours in said workpiece without stopping between cuts.

8. The plasma arc torch system of claim 1, wherein the computer numerical controller is configured to determine a pierce time prior to piercing said workpiece.

9. The plasma arc torch system of claim 1, wherein said pierce time increases as a diameter of said hole decreases.

10. The plasma arc torch system of claim 1, wherein the computer numerical controller is configured to determine a kerf value for said plasma arc torch prior to piercing said workpiece and to use said kerf value to calculate said first lead in geometry.

11. The plasma arc torch system of claim 1, wherein a rate of cutting of said first lead in geometry and a rate of cutting of said hole geometry are a same rate.

12. The plasma arc torch system of claim 1, wherein a rate of cutting of said first lead in geometry is faster than a rate of cutting of said hole geometry.

13. The plasma arc torch system of claim 1, wherein a rate of cutting of said first lead in geometry is slower than a rate of cutting of said hole geometry.

14. The plasma arc torch system of claim 1, wherein said first lead in geometry includes a straight line cut portion and an arc path cut portion from said piercing location to said hole geometry.

15. The plasma arc torch system of claim 1, wherein said first lead in geometry includes a spiral path from said piercing location to said lead in point on said hole geometry, and wherein said spiral path passes through an arc path in a range of 240 degrees to 720 degrees.

16. The plasma arc torch system of claim 1, wherein said computer numerical controller is further configured to adjust a first shield gas pressure during cutting of said first lead in geometry and a second shield gas pressure during cutting said hole geometry, and wherein said first shield gas pressure is equal to said second shield gas pressure.

17. The plasma arc torch system of claim 1, wherein said overburn distance is proportional to a diameter of said hole geometry, and wherein said overburn distance is in a range of 0.01 to 0.3 inches.

18. The plasma arc torch system of claim 1, wherein said computer numerical controller is further configured to determine an overburn time based on a ratio of said overburn distance and a feed rate.

19. The plasma arc torch system of claim 1, wherein said computer numerical controller is further configured to slow a feed rate of said plasma arc torch at a transition point prior to reaching said lead in point for said second contour geometry.

20. The plasma arc torch system of claim 19, wherein said feed rate is slowed in a range of 25% to 45% of a feed rate of said plasma arc torch prior to reaching said transition point.

21. The plasma arc torch system of claim 19, wherein a distance between said transition point and said lead in point for said second contour geometry is in a range of 0.125 to 0.5 inches.

22. The plasma arc torch system of claim 1, wherein said angle is in a range of 28 to 32 degrees.

23. The computer readable product of claim 3, wherein said workpiece is one of mild steel and stainless steel.

* * * * *